(12) United States Patent
Sarosi et al.

(10) Patent No.: US 9,253,537 B2
(45) Date of Patent: Feb. 2, 2016

(54) APPARATUS AND METHODS FOR CONTROLLING DIGITAL VIDEO RECORDERS

(75) Inventors: George Sarosi, Niwot, CO (US); Chris Cholas, Frederick, CO (US); David Bell, Broomfield, CO (US); William L. Helms, Longmont, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 123 days.

(21) Appl. No.: 13/596,969

(22) Filed: Aug. 28, 2012

(65) Prior Publication Data

US 2014/0068688 A1   Mar. 6, 2014

(51) Int. Cl.

| | |
|---|---|
| *H04N 7/173* | (2011.01) |
| *H04N 21/47* | (2011.01) |
| *H04N 5/76* | (2006.01) |
| *H04N 21/41* | (2011.01) |
| *H04N 21/436* | (2011.01) |
| *H04N 21/472* | (2011.01) |
| *H04N 21/6587* | (2011.01) |
| *H04N 5/445* | (2011.01) |
| *H04N 5/765* | (2006.01) |

(52) U.S. Cl.
CPC ............... *H04N 21/47* (2013.01); *H04N 5/76* (2013.01); *H04N 21/4135* (2013.01); *H04N 21/43622* (2013.01); *H04N 21/47214* (2013.01); *H04N 21/6587* (2013.01); *H04N 5/765* (2013.01)

(58) Field of Classification Search
CPC ............ H04N 21/274; H04N 21/4334; H04N 21/47214; H04N 21/25883; H04N 21/43615; H04N 21/442; H04N 21/47202; H04N 21/472; H04N 21/47208; H04N 21/47211; H04N 21/47217; H04N 21/2747; H04N 21/4135; H04N 21/4147
USPC .......... 725/58, 88, 93, 102; 386/296, 298, 291
See application file for complete search history.

(56) References Cited

U.S. PATENT DOCUMENTS

| | | | | |
|---|---|---|---|---|
| 5,046,092 | A * | 9/1991 | Walker ................. | H04N 7/1675 348/E7.056 |
| 5,323,234 | A * | 6/1994 | Kawasaki ............. | H04N 5/765 386/E5.002 |
| 5,367,330 | A * | 11/1994 | Haave et al. .................. | 725/104 |
| 5,570,414 | A * | 10/1996 | Stern ...................... | H04M 3/533 379/67.1 |
| 6,061,503 | A * | 5/2000 | Chamberlain ................ | 709/217 |
| 6,208,799 | B1 * | 3/2001 | Marsh et al. .................. | 386/292 |
| 6,374,406 | B2 * | 4/2002 | Hirata ........................... | 725/132 |

(Continued)

*Primary Examiner* — Pankaj Kumar
*Assistant Examiner* — Reuben M Brown
(74) *Attorney, Agent, or Firm* — Otterstedt, Ellenbogen & Kammer, LLP

(57) ABSTRACT

A DVR controller in network communication with a digital video recorder receives an instruction from a user directing the digital video recorder to perform a function among a set of available functions. The set of available functions comprises a record function operative to cause the digital video recorder to record content and store that content on the digital video recorder, and a playback function operative to cause the digital video recorder to play back content stored on the digital video recorder. Subsequently, at least in part in response to the instructions from the user, the DVR controller issues a command to the digital video recorder to perform the function. The digital video recorder is operative to present content on a presentation device controlled by the user. The DVR controller, in turn, is remotely disposed from the digital video recorder in a facility of a content provider.

19 Claims, 9 Drawing Sheets

(56) References Cited

U.S. PATENT DOCUMENTS

| | | | |
|---|---|---|---|
| 7,457,520 B2* | 11/2008 | Rossetti et al. | 386/291 |
| 8,155,507 B2* | 4/2012 | Lee | 386/291 |
| 8,286,208 B2* | 10/2012 | Pasko et al. | 725/58 |
| 8,424,042 B2* | 4/2013 | Yamamoto et al. | 725/58 |
| 8,798,433 B2* | 8/2014 | Bumgardner et al. | 386/200 |
| 2003/0159151 A1* | 8/2003 | Ikeda | 725/58 |
| 2003/0190149 A1* | 10/2003 | Chang et al. | 386/83 |
| 2004/0049794 A1* | 3/2004 | Shao et al. | 725/89 |
| 2004/0197082 A1* | 10/2004 | Yim | 386/83 |
| 2005/0229213 A1* | 10/2005 | Ellis et al. | 725/58 |
| 2006/0147181 A1* | 7/2006 | Kwon et al. | 386/83 |
| 2007/0118857 A1* | 5/2007 | Chen et al. | 725/61 |
| 2008/0201751 A1* | 8/2008 | Ahmed et al. | 725/109 |
| 2008/0235739 A1* | 9/2008 | Coebergh Van Den Braak | 725/86 |
| 2009/0007204 A1* | 1/2009 | Yang et al. | 725/110 |
| 2010/0070997 A1* | 3/2010 | Friedman | 725/37 |
| 2010/0169829 A1* | 7/2010 | Stallings | H04N 21/4331 715/810 |
| 2010/0305722 A1* | 12/2010 | Jin | H04L 12/2818 700/90 |
| 2011/0016503 A1* | 1/2011 | Schaefer et al. | 725/115 |
| 2011/0194840 A1* | 8/2011 | Alexander | 386/293 |
| 2012/0291104 A1* | 11/2012 | Hasek | 726/4 |
| 2013/0055312 A1* | 2/2013 | Cheng et al. | 725/49 |
| 2014/0068688 A1* | 3/2014 | Sarosi et al. | 725/109 |

* cited by examiner

APPARATUS AND METHODS FOR CONTROLLING DIGITAL VIDEO RECORDERS

FIELD OF THE INVENTION

The present invention relates generally to the electrical, electronic, and computer arts, and more particularly relates to digital video recorders and the like.

BACKGROUND OF THE INVENTION

Use of digital video recorders (DVRs), also known as personal video recorders (PVRs), is ubiquitous. Such devices may provide several benefits to TV viewers. For example, a prior art DVR allows a user to record his or her favorite TV programs for later review, and to exercise a season-pass-like option wherein every episode of his or her favorite program is recorded for some period. Such devices may automatically record programs for the user based on his or her viewing habits and preferences. The presentation of the recorded programming content can be manipulated by exercising rewind, pause, skip and/or fast-forward functions furnished by the DVR.

SUMMARY OF THE INVENTION

In accordance with an aspect of the invention, a DVR controller in network communication with a digital video recorder receives an instruction from a user directing the digital video recorder to perform a function among a set of available functions. The set of available functions comprises a record function operative to cause the digital video recorder to record content and store that content on the digital video recorder, and a playback function operative to cause the digital video recorder to play back content stored on the digital video recorder. Subsequently, at least in part in response to the instruction from the user, the DVR controller issues a command to the digital video recorder to perform the function. The digital video recorder is operative to present content on a presentation device controlled by the user. The DVR controller, in turn, is remotely disposed from the digital video recorder in a facility of a content provider.

In accordance with another aspect of the invention, a computer program product comprises a tangible computer readable storage medium having computer readable program code embodied therewith. The computer readable program code is configured to receive an instruction from a user directing the digital video recorder to perform a function among a set of available functions. The set of available functions comprises a record function operative to cause the digital video recorder to record content and store that content on the digital video recorder, and a playback function operative to cause the digital video recorder to play back content stored on the digital video recorder. The computer readable program code is also configured to, at least in part in response to the instruction from the user, issue a command to the digital video recorder to perform the function. The digital video recorder is operative to present content on a presentation device controlled by the user. The DVR controller is remotely disposed from the digital video recorder in a facility of a content provider.

In accordance with yet another aspect of the invention, a DVR controller in network communication with a digital video controller comprises a memory and at least one processor coupled to the memory. The at least one processor is operative to receive an instruction from a user directing the digital video recorder to perform a function among a set of available functions. The set of available functions comprises a record function operative to cause the digital video recorder to record content and store that content on the digital video recorder, and a playback function operative to cause the digital video recorder to play back content stored on the digital video recorder. The at least one processor is also operative to issue, at least in part in response to the instruction from the user, a command to the digital video recorder to perform the function. The digital video recorder is operative to present content on a presentation device controlled by the user. The DVR controller is remotely disposed from the digital video recorder in a facility of a content provider.

In accordance with yet another aspect of the invention, a DVR controller in network communication with a digital video recorder comprises means for receiving an instruction from a user directing the digital video recorder to perform a function among a set of available functions. The set of available functions comprises a record function operative to cause the digital video recorder to record content and store that content on the digital video recorder, and a playback function operative to cause the digital video recorder to play back content stored on the digital video recorder. The DVR controller also comprises means for issuing, at least in part in response to the instruction from the user, a command to the digital video recorder to perform the function. The digital video recorder is operative to present content on a presentation device controlled by the user. The DVR controller is remotely disposed from the digital video recorder in a facility of a content provider As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

These and other features and advantages of the invention will become apparent from the following detailed description of illustrative embodiments thereof, which is to be read in connection with the accompanying drawings.

DETAILED DESCRIPTION OF PREFERRED EMBODIMENTS

Figure 1:
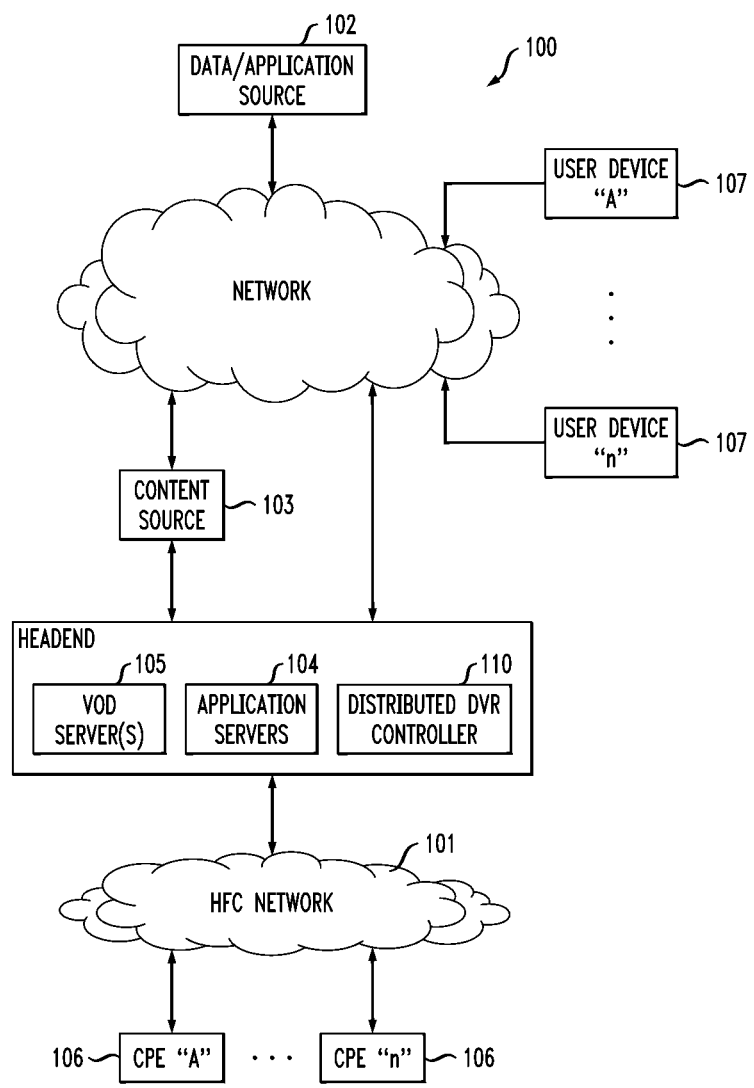
FIG. 1 shows a block diagram of at least a portion of an exemplary hybrid fiber-coaxial (RFC) network configuration in accordance with an illustrative embodiment of the invention.

FIG. 1 illustrates a typical content-based network configuration 100. The various components of the network 100 include (i) one or more data and application origination points 102; (ii) one or more content sources 103, (iii) one or more application distribution servers 104; (iv) one or more video-on-demand (VOD) servers 105, (v) consumer (or customer) premises equipment (CPE) 106; (vi) one or more user devices 107; and (vii) one or more distributed DVR controllers 110. The application server(s) 104, VOD servers 105, CPE(s) 106, and distributed DVR controller(s) 110 are connected via a bearer (e.g., hybrid fiber cable (HFC)) network 101. A simple architecture is shown in FIG. 1 for illustrative brevity, although it will be recognized that comparable architectures with multiple origination points, content sources, distribution servers, VOD servers, CPE devices, user devices, and/or distributed DVR controllers (as well as different network topologies) may be utilized consistent with the invention. For example, the headend architecture of FIG. 1a (described in greater detail below) may be used.

It should be noted at this point that in addition to a conventional HFC network or a switched digital network to be discussed below, other kinds of video content networks can be employed for network 101 (e.g., fiber-to-the-home (FTTH) or fiber-to-the-curb (FTTC)).

The data/application origination point 102 comprises any medium that allows data and/or applications (such as a VOD-based or "Watch TV" application) to be transferred to a distribution server 104 (for example, over a suitable network, not separately numbered). This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 comprises a computer system where such applications can enter the network system. Distribution servers per se are well known in the networking arts.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the customers' premises (or other appropriate locations) that can be accessed by a distribution server 104; for example, set-top terminal (STT), digital set-top box (DSTB), set-top box (STB), or simply "box," and the like.

The user devices 107 include any network-enabled, user-operated apparatus operative to communicate with the headend via network communications such as the Internet. The user devices 107 may, as just a few non-limiting examples, comprise personal computers (e.g., desktop computers, laptop computers, and netbook computers), "smart" cellular telephones, personal digital assistants, tablet computers, and the like. Network communications may be via a TCP/IP communications protocol or by several other well-known protocols. Physical connections to the network may be either wired or wireless (including satellite).

Figure 1A:
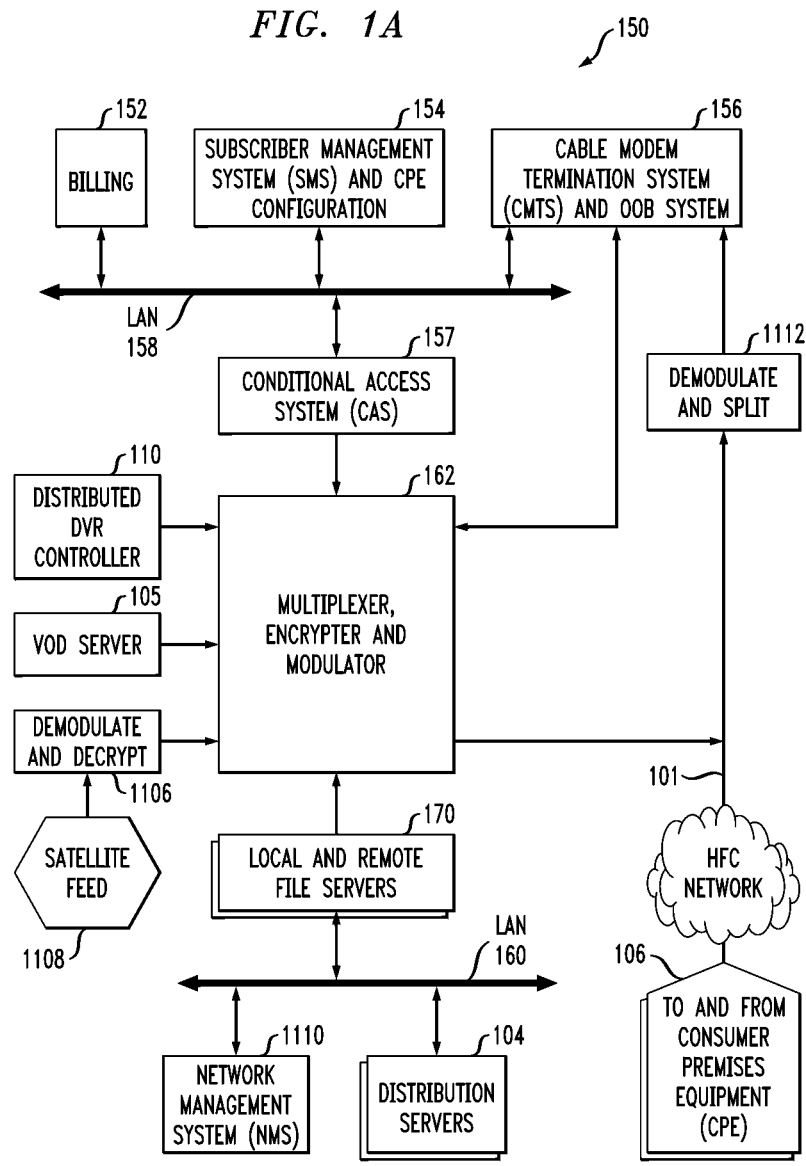
FIG. 1a shows a block diagram of at least a portion of an exemplary HFC cable network headend configuration for use with the FIG. 1 HFC network.

Referring now to FIG. 1a, one exemplary embodiment of a headend architecture is described. As shown in FIG. 1a, the headend architecture 150 comprises typical headend components and services including billing module 152, subscriber management system (SMS) and CPE configuration management module 154, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the headend configuration depicted in FIG. 1a is high-level, conceptual architecture and that each multi-service operator or multiple system operator (MSO) may have multiple headends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the headend should be adapted to acquire the information for the carried channels from various sources. Typically, the channels being delivered from the headend 150 to the CPE 106 ("downstream") are multiplexed together in the headend and sent to neighborhood hubs (see FIG. 1b) via a variety of interposed network components.

Content (e.g., audio, video, etc.) is provided in each downstream (in-band) channel associated with the relevant service group. To communicate with the headend or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo.

80027, USA) and associated protocols. The OpenCable™ Application Platform (OCAP) 1.0, 2.0, 3.0 (and subsequent) specification (Cable Television Laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Figure 1B:
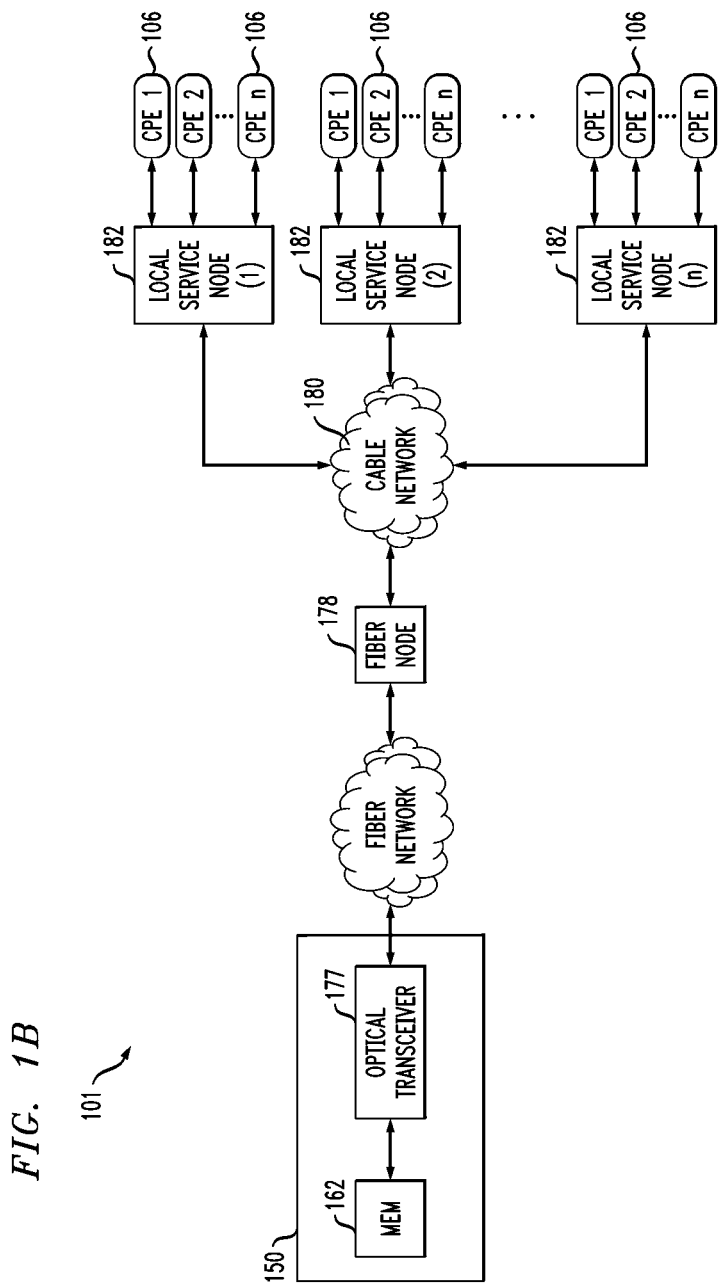
FIG. 1b shows a block diagram of an exemplary local service node configuration for use with the FIG. 1 HFC network.

As shown in FIG. 1*b*, the network 101 of FIGS. 1 and 1*a* comprises a fiber/coax arrangement wherein the output of the MEM 162 of FIG. 1*a* is transferred to the optical domain (such as via an optical transceiver 177 at the headend 150 or further downstream). The optical domain signals are then distributed to a fiber node 178, which further distributes the signals over a distribution network 180 to a plurality of local servicing nodes 182. This provides an effective 1:N expansion of the network at the local service end.

Figure 1C:
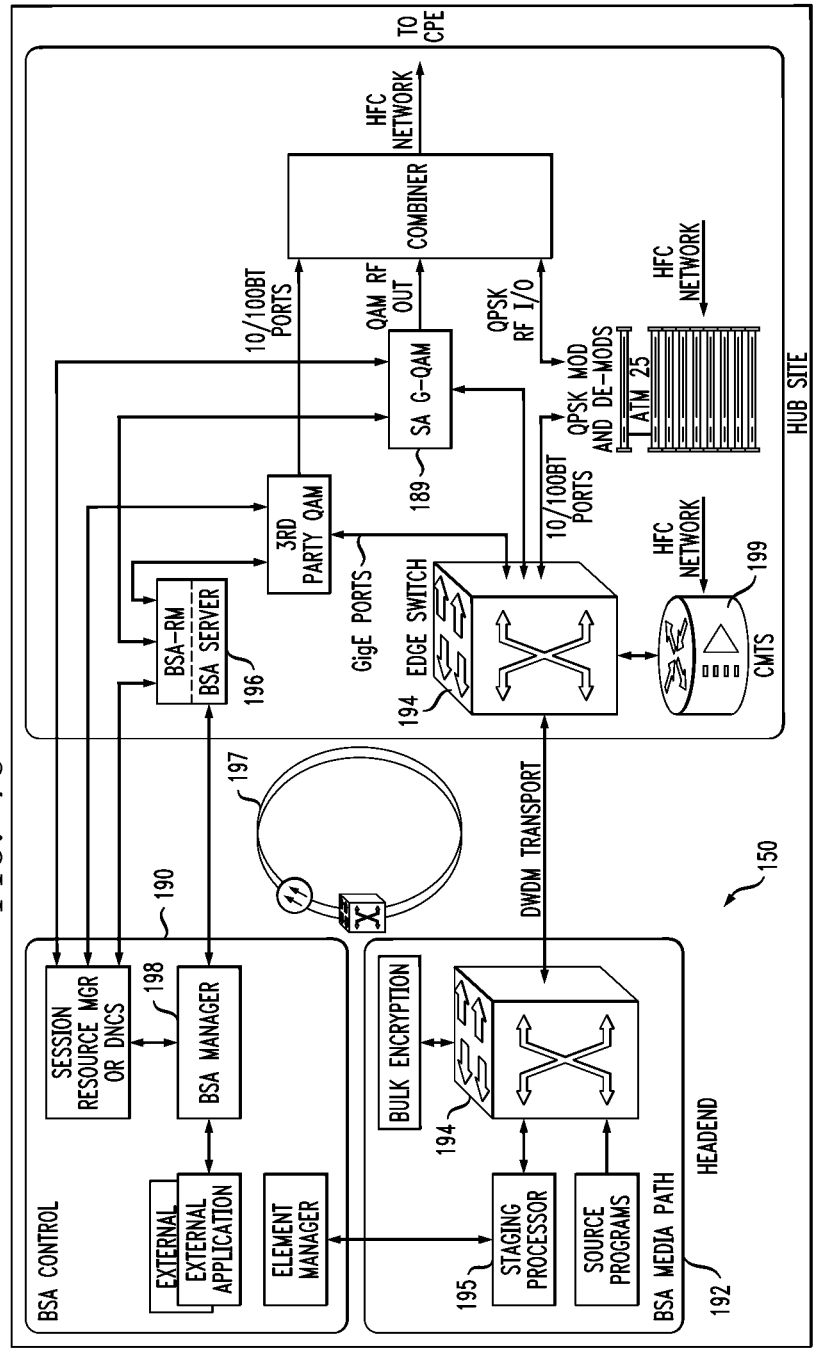
FIG. 1c shows a block diagram of at least a portion of an exemplary broadcast switched architecture (BSA) network for use with the FIG. 1 HFC network.

FIG. 1*c* illustrates an exemplary "switched" network architecture also useful with one or more embodiments of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1*c* shows implementation details of one exemplary embodiment of this broadcast switched network architecture. Specifically, the headend 150 contains switched broadcast control and media path functions 190, 192 (the latter including staging processor 195); these elements cooperate to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

US Patent Publication 20030056217 of Paul D. Brooks, entitled "Technique for Effectively Providing Program Material in a Cable Television System," the complete disclosure of which is expressly incorporated herein by reference for all purposes, describes one exemplary broadcast switched digital architecture useful with one or more embodiments of the present invention, although it will be recognized by those of ordinary skill that other approaches and architectures may be substituted. In a cable television system in accordance with the Brooks invention, program materials are made available to subscribers in a neighborhood on an as needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood.

In addition to "broadcast" content (e.g., video programming), the systems of FIGS. 1*a*-1*c* may also deliver Internet data services using the Internet protocol (IP), although other protocols and transport mechanisms of the type well known in the digital communication art may be substituted. One exemplary delivery paradigm comprises delivering MPEG-based video content, with the video transported to user personal computers (PCs) (or IP-based set-top boxes (STBs)) over DOCSIS channels comprising MPEG (or other video codec such as H.264 or AVC) over IP over MPEG. That is, the higher layer MPEG or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream quadrature amplitude modulation (QAM) channels (QAMs) to the tuner of the user's STB or other receiver device for viewing on the television, and also as packetized IP data over the DOCSIS QAMs to the user's PC or other IP-enabled device via the user's cable modem.

Referring again to FIG. 1*c*, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component. Note also that edge switch 194 in block 150 in FIG. 9 can, in the most general case, be the same or different as that shown in the hub site of FIG. 1*c*. Also, in other embodiments, CMTS 199 could be located in a place other than the hub site.

The edge switch 194 forwards the packets received from the CMTS 199 to the QAM modulator 189, which transmits the packets on one or more physical (QAM-modulated RF) channels to the CPEs 106. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It will be appreciated that while some descriptions presented herein are described in the context of Internet services that include multicast and unicast data, there is potential applicability to other types of services that include multicast transmission of data delivered over a network having multiple physical channels or even virtual or logical channels. For example, switching between various physical channels that comprise a virtual channel, can itself be conducted according to the "switched" approach. As a simple illustration, if a first virtual channel is comprised of physical channels (e.g., QAMs) A, B and D, and a second virtual channel is comprised of QAMs C, E and F, a cable modem (CM) or other CPE can be configured to switch between the A/B/D and C/E/F virtual channels as if they were a single QAM.

The configurations shown in FIGS. 1a-1c are exemplary in nature and different approaches may be used in other embodiments; such other approaches may have more or less functionality (for example, high speed Internet data services might be omitted in some cases).

Figure 2:
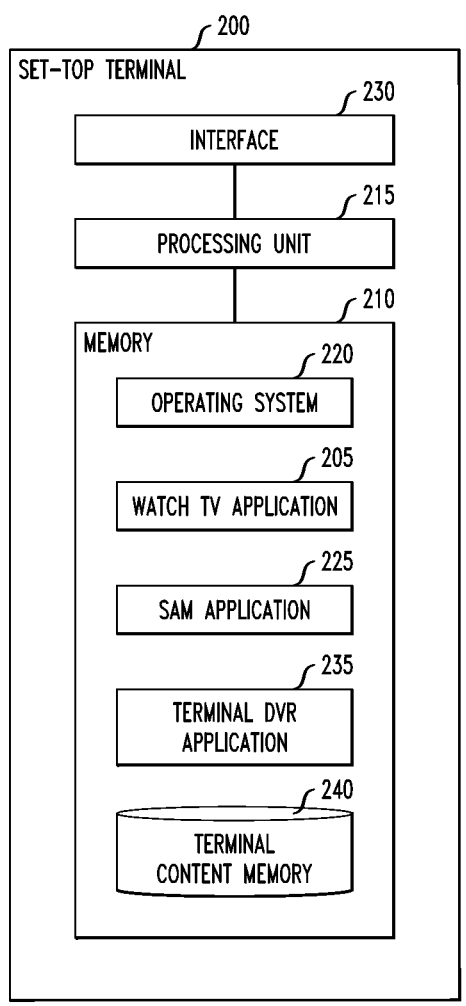
FIG. 2 shows a block diagram of at least a portion of an exemplary set-top terminal for use with the FIG. 1 HFC network.

FIG. 2 shows a block diagram of at least some elements of an exemplary set-top terminal 200, which is one form of a CPE 106. A conventional "Watch TV" application 205 is installed in the set-top terminal 200 to service those program channels (or programs) afforded the traditional broadcast service. The Watch TV application 205, residing in a memory 210, provides such well-known functions as channel navigation control, channel selection in response to a channel change event, etc. A channel change event occurs when a user at the set-top terminal 200 issues a command to change from one program channel to another. Such a command may be issued, say, using a remote control (not shown), which signal is receptive by the set-top terminal 200. The memory 210 in this instance comprises one or more caches, disks, hard drives, non-volatile random access memories (NVRAMs), dynamic random access memories (DRAMs), read-only memories (ROMs), and/or Flash ROMs.

For example, in the memory 210, NVRAM may be used for storage of a user's settings and set-top terminal configuration settings, such as parental control codes, favorite channel line-ups, set-top terminal setups, channel maps, authorization tables, and FDC address assignments. DRAM may be used for most application and operating system storage requirements, such as stacks, heaps, graphics, interactive program guide data, marketing data and usage data, and functions such as MPEG-2 video decompression, DOLBY DIGITAL® (registered mark of Dolby Laboratories Licensing Corporation, San Francisco, Calif.) Adaptive Transfer Coding 3 (AC-3) audio decoding, and video manipulation. ROM may be used for storage of the operating system. Flash ROM may be used for storage of resident application software, as well as patches of the operating system and application software, which software and/or patches are downloaded to the set-top terminal 200 from the headend 150 after the set-top terminal 200 has been deployed at the user's premises.

A processing unit 215 orchestrates the operations of the set-top terminal 200. It executes instructions stored in the memory 210 under the control of an operating system 220. A service application manager (SAM) application 225 is also stored in memory 210 and may form part of the operating system 220. The SAM application 225 is responsible for, among other things, monitoring channel change events; administering channel, service and other tables in the set-top terminal 200; and maintaining a registry of applications in the set-top terminal 200. One such application is the aforementioned Watch TV application 205, which is invoked to service a traditional broadcast channel (or program). An interface 230 allows receipt of in-band and out-of-brand material from the headend 150, as well as sending communications to the headend 150 via a reverse data channel (for example, of the kind(s) discussed above).

The interface 230 may include an RF front end (including demodulator and decryption unit) for interface with the network, as well as a plurality of different types of interfaces (e.g., video/audio interfaces, IEEE-1394 "Firewire", USB, serial/parallel ports, etc.) for interface with other end-user apparatus such as televisions, personal electronics, computers, WiFi/PAN or other network hubs/routers, etc. Other components which may be utilized within the set-top terminal 200 include RF tuner stages, buffer memory (which may be implemented in RAM or otherwise), various processing layers (e.g., DOCSIS MAC or DAVIC OOB channel, MPEG, etc.) as well as media processors and other specialized system-on-chip (SoC) or application-specific integrated circuit (ASIC) devices. These additional components and functionality are, in and of themselves, well known to those of ordinary skill in the cable and embedded system fields, and accordingly are not described further herein.

The set-top terminal 200 may also be provided with an OCAP-compliant monitor application and Java-based middleware which, inter alia, manages the operation of the set-top terminal 200 and applications running thereon. It will be recognized by those of ordinary skill that myriad different device and software architectures may be used consistent with the invention.

The set-top terminal 200 also provides digital video recorder (DVR) functionality. To this end, the memory 210 further includes a terminal DVR application 235 and a terminal content memory 240 (e.g., one or more hard drives) for storing content locally on the set-top terminal 200. While, in the embodiment shown in FIG. 2, the set-top terminal 200 provides DVR functionality, in other instances, separate set-top terminals are associated with separate DVRs.

In accordance with an aspect of the invention, DVR functionality is implemented on a particular set-top terminal 200 utilizing a unique combination of the terminal DVR application 235 in the set-top terminal 200 and the distributed DVR controller 110 in the headend 150. More specifically, in one or more embodiments of the invention, a user issues an instruction directing the set-top terminal 200 to perform a function among a set of available functions. Such an instruction may come from the set-top terminal 200 or, alternatively, may come from a user device 107. The instruction, in turn, is transmitted to the distributed DVR controller 110 in the headend 150, which reacts, when and if appropriate, by transmitting a command to the set-top terminal 200 to perform the function. In this manner, the DVR functionality of the set-top terminal 200 is actually controlled by routing user instructions through the distributed DVR controller 110 rather than solely by internal logic. Notably, this all occurs with the distributed DVR controller 110 being remote to the set-top terminal and in network communications therewith. More particularly, the set-top terminal 200 is located near a presentation device controlled by the user (e.g., in the user's home or workplace) so that the set-top terminal 200 can present content on that presentation device. The distributed DVR controller 110, in contrast, is located remotely to the set-top terminal 200 at a site operated by the cable provider (e.g., in the cable provider's headend 150).

The above-described set of functions available to the user in controlling the DVR functionality of the set-top terminal 200 may include both functions related to recording and playing back content on the set-top terminal 200 (hereinafter "record-playback functions") as well as functions related to presenting information on the set-top terminal 200 (hereinafter "information functions"). In addition to causing the set-top terminal 200 to perform basic record and playback functions, the record-playback functions may also act to cause the set-top terminal 200 to perform, as just a few examples, fast-forward, rewind, skip, pause, slow motion, and stop functions during play back. Moreover, the record-playback functions may act to cause the set-top terminal 200 to delete content stored in the terminal content memory 240. Information functions, in contrast, act to cause the set-top terminal 200 to present information such as program menus, program guides, content descriptions, previews, and other information received from the headend 150 or other sources (e.g., the Internet).

Figure 2A:
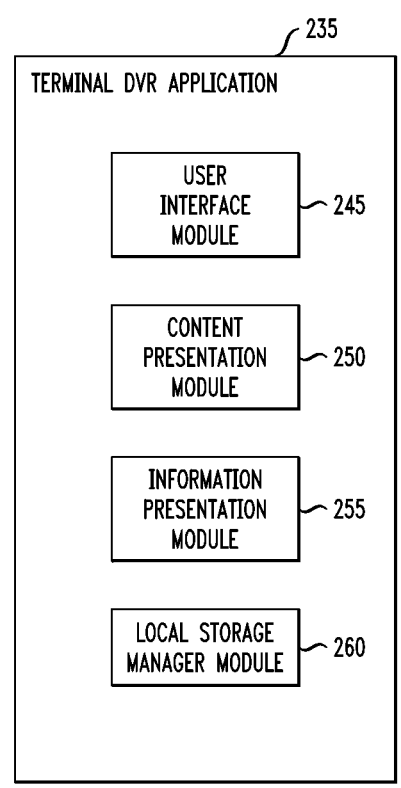
FIG. 2a shows a block diagram of at least a portion of an exemplary terminal DVR application for use with the FIG. 1 HFC network.

Aspects of the terminal DVR application 235, the user devices 107, and the distributed DVR controller 110 act to facilitate this novel functionality. Additional aspects of the terminal DVR application 235, in accordance with an illustrative embodiment of the invention, are detailed in the block diagram shown in FIG. 2a. The DVR application 235 comprises a user interface module 245, a content presentation module 250, an information presentation module 255, and a local storage manager module 260. The user interface module 245 is operative to provide a user with the ability to issue instructions to the terminal DVR application 235 via, for example, front panel pushbuttons or a remote control (e.g., infrared type or radio frequency type). The content presentation module 250, in turn, is operative to receive and execute commands from the distributed DVR controller 110 related to record-playback functions. The information presentation module 255 allows the set-top terminal 200 to perform commands from the distributed DVR controller 110 related to information functions. Lastly, the local storage manager module 260 is operative to store and manage content on the terminal content memory 240 as required.

Figure 3:
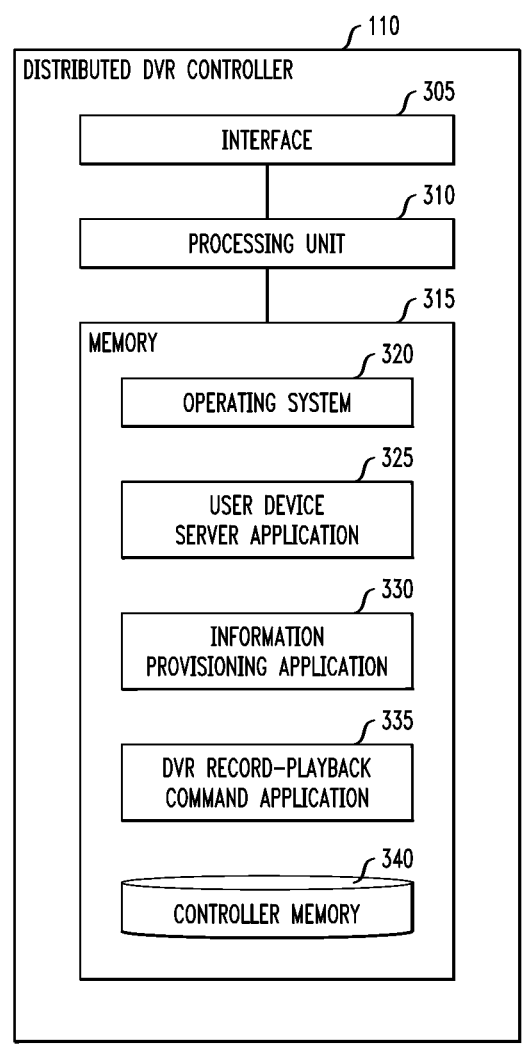
FIG. 3 shows a block diagram of at least a portion of an exemplary distributed DVR controller for use with the FIG. 1 HFC network.

Complementary aspects of the distributed DVR controller 110, also in accordance with an illustrative embodiment of the invention, are shown in FIG. 3. Here, the distributed DVR controller 110 comprises an interface 305, a processing unit 310, and a memory 315. The processing unit 310 orchestrates the operations of the distributed DVR controller 110. As at least part of its function, for example, it executes instructions stored in the memory 315 under the control of an operating system 320. The interface 305 allows the distributed DVR controller 110 to communicate (e.g., exchange data) with external elements in a manner similar to the interface 230 of the set top terminal 200, described above. As was also the case for the set-top terminal 200, the memory 315 of the distributed DVR controller 110 may comprise one or more caches, disks, hard drives, NVRAMs, DRAMs, ROMs, and/or Flash ROMs.

In addition to the operating system 320, the memory 315 includes a user device server application 325, an information provisioning application 330, a DVR record-playback command application 335, and a controller memory 340. The user device server application 325 is operative to cause the distributed DVR controller 110 to act as both a web server and a mobile app server for the user devices 107. In so doing, the user device server application 325 allows the distributed DVR controller 110 to receive and process instructions from users. The information provisioning application 330 is operative to send information such as program menus, program guides, content descriptions, previews, and other information to the set-top terminal 200 for presentation by the information presentation module 255 of the terminal DVR application 235. Finally, the DVR record-playback command application 335 is operative to cause the distributed DVR controller 110 to send commands related to recording and playback to the set-top terminal 200 for performance by the content presentation module 250 of the terminal DVR application 235.

Content available for recording and playback may include, for example, video content, audio content, image content, text content, and the like. A particular portion of content may therefore comprise, as just a few examples, the whole or some fraction of a movie, television show, video, song, or image. In one or more embodiments of the invention, the information presentation module 255 of the terminal DVR application 235 in conjunction with the user interface module 245 may present the user with an interface (e.g., menu, list, etc.) for selecting one or more portions of content to be recorded. In interacting with this interface, a particular portion of content may be selected by the user specifying the channel on which the program is airing and its respective starting and ending times. Alternatively or additionally, the selection of the portion of content may be facilitated by providing the user with an interactive electronic program guide (IEPG) that specifies upcoming content that is available for receipt by that user. Such IEPGs and their implementation on a set-top terminal like the set-top terminal 200 will be familiar to one of ordinary skill in the art. Listing schedules are available from Tribune Media Services (Orlando, Fla.) as well as several other providers.

As indicated earlier, the user devices 107 allow a means for a user to communicate instructions to the distributed DVR controller 110 without utilizing pushbuttons or a remote control for the set-top terminal 200. This added capability allows a user, for example, to schedule a recording while away from home, where the set-top terminal 200 is located. The user interface on the user device 107 may be in the form of a browser-based web page or an "app" (application) specifically generated for that purpose. Communications with the distributed DVR controller 110 is, as indicated above, via the user device server application 325, which can comprise an HTTP-based web server component as required. Nevertheless, any other equally suitable network communications protocol such as, but not limited to, SSL, TCP-sockets, SMS, MMS, and others may also be utilized.

Figure 4:
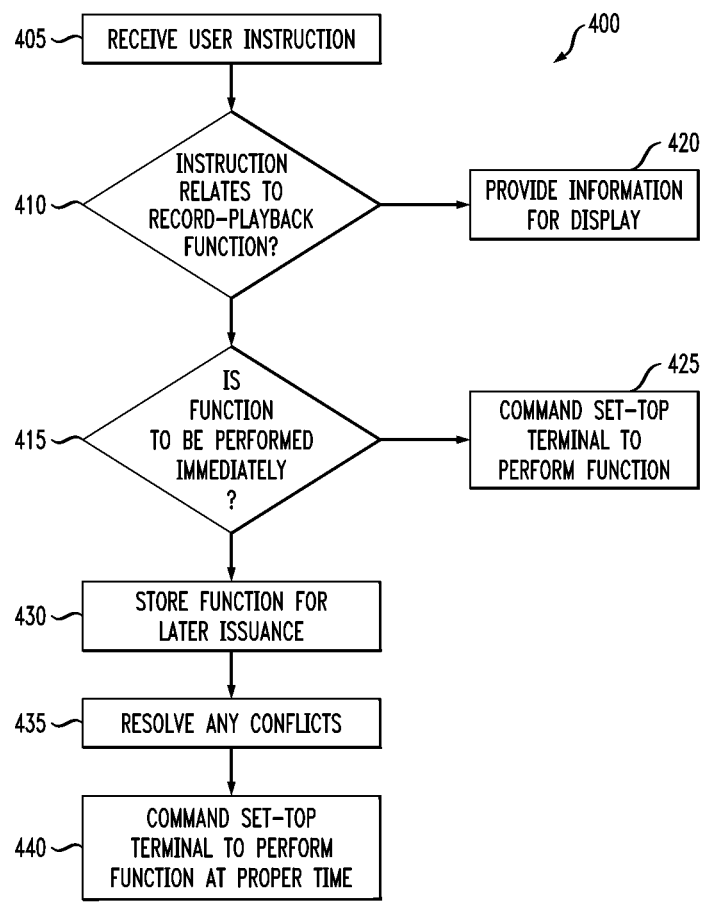
FIG. 4 shows a flow diagram of an exemplary method for controlling a DVR in the FIG. 1 HFC network.

Once so configured, the apparatus described above can be used to control a digital video recorder in an entirely novel fashion. FIG. 4 shows a method 400 for controlling a digital video recorder in accordance with an illustrative embodiment of the invention. In step 405, the distributed DVR controller 110 receives a user instruction. As detailed above, such an instruction may come from the set-top terminal 200 in response to the actuation of a front panel pushbutton or in response to the operation of a remote control, or, alternatively, such an instruction may come from a user device 107. An instruction may relate to a record-playback function or an information function. The nature of the instruction is thereby determined in step 410. If the instruction is related to a record-playback function, the method 400 progresses to step 415. If the instruction, instead, does not relate to a record-playback function (i.e., the instruction relates to an information function), the method 400 instead progresses to step 420. This last step (step 420) has the information provisioning application 330 of the distributed DVR controller 110 provide the requested information to the set-top terminal 200 for presentation by the information presentation module 255 in conjunction with the user interface module 245, as described above.

Step 415, in contrast, has the distributed DVR controller 110 perform an additional analysis step, namely determining whether the instruction relates to a record-playback function that is one to be performed immediately or, instead, is one to be performed at a future time. Record-playback functions to be performed immediately include, for example, playback as well as fast forward, rewind, skip, pause, slow motion, and stop functions that are performed during playback. Record-playback functions to be performed immediately also include an "immediate" record function that is not associated with a future time. Record-playback functions to be performed at a future time include "scheduled" record functions. Here the user, either directly or indirectly through the use of, for example, a program guide, specifies a time period and channel to be recorded at a future time. Where the record-playback function is to be performed immediately, the method 400 progresses to step 425. Where the record-playback function is to be performed at a future time, the method 400 instead progresses to step 430.

Step 425 has the distributed DVR controller 110 issue a command to the set-top terminal 200 (via the content presentation module 250 of the terminal DVR application 235) to perform the record-playback function associated with the instruction received in step 405. Recognizing that the function is not to be performed immediately, step 430, in contrast, has the distributed DVR controller 110 store the parameters (e.g., time period and channel) for the record-playback function in memory. Step 435 then has the distributed DVR controller 110 perform conflict resolution (detailed below) on that function. Finally, assuming the instruction survives the conflict resolution step (step 435), step 440 has the distributed DVR controller 110 issue a command to the set-top terminal 200 to perform the record-playback function when the appropriate time period is reached.

The conflict resolution step 435 preferably causes the distributed DVR controller 110 to determine whether a conflict exists between scheduled functions, more particularly between scheduled record functions. If the user instruction asks that the set-top terminal 200 record a number of programs at the same time, for example, the distributed DVR controller 110 determines whether those concurrent record operations are within the capabilities of the set-top terminal 200. If they are not, the distributed DVR controller 110 can implement one of several solutions. The distributed DVR controller 110 may, for example, cancel one of the scheduled recordings based on a "priority" specified by the user. Alternatively, the distributed DVR controller 110 may bring the conflict to the attention of the user via, for example, the information presentation module 255 of the terminal DVR application 235 in the set-top terminal 200 and allow the user to choose a method of resolution (e.g., canceling a recording, rescheduling a recording, truncating a recording, etc.).

It should be clear from the proceeding description, that the DVR functionality of the set-top terminal 200 is not controlled solely by internal logic but, instead, is highly dependent on commands issued by the remote distributed DVR controller 110. At the same time, recorded content associated with the DVR functionality continues to be stored on the set-top terminal 200. The apparatus and methods described herein thereby achieve a unique combination of network control via a remote system (sometimes called "cloud based" control) and local content storage. Performing DVR control utilizing apparatus and method in accordance with aspects of the invention may provide several advantages. To upgrade the DVR functionality within a multitude of set-top terminals 200, for example, the set-top terminals 200 themselves do not generally have to be modified. Rather, only the functionality of the distributed DVR controller 110 need be modified and these changes will carry over to the operations of the set-top terminals 200. Provisioning of updates and new DVR capabilities thereby becomes substantially easier and more efficient. Moreover, as indicated above, embodiments in accordance with aspects of the invention facilitate the issuing of user instructions from user devices 107 other than set-top terminals 200 (and their associated remote controls). A user's ability to control their DVR, and more generally, the overall user experience is thereby greatly enhanced.

System and Article of Manufacture Details

The invention can employ hardware or hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein. Appropriate interconnections via bus, network, and the like can also be included.

Figure 5:
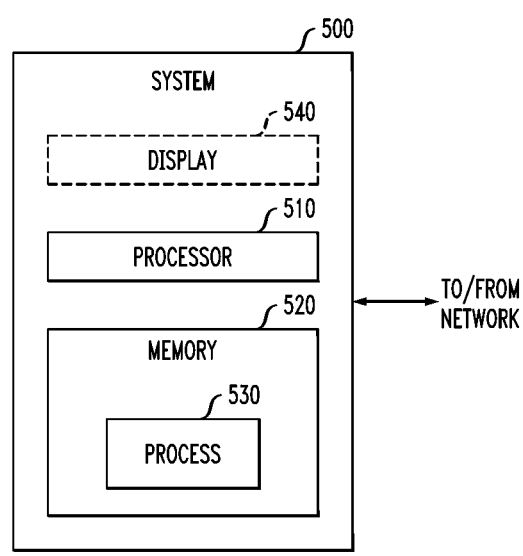
FIG. 5 shows a block diagram of an exemplary system operative to implement at least a portion of one or more aspects of the present invention.

FIG. 5 is a block diagram of a system 500 that can implement part or all of one or more aspects or processes of the present invention, a processor 510 of which is representative of processors associated with servers (e.g., FIGS. 1-1c), clients, set-top terminals (e.g., FIGS. 2 and 2a), controllers (e.g., FIGS. 1, 1a, and 3), user devices (e.g., FIG. 1) and other elements with processing capabilities depicted in the other figures. In one or more embodiments, inventive steps are carried out by one or more of the processors in conjunction with one or more interconnecting network(s).

As shown in FIG. 5, a memory 520 configures the processor 510 to implement one or more aspects of the methods, steps, and functions disclosed herein (collectively, shown in exemplary method 400 in FIG. 4) The memory 520 could be distributed or local and the processor 510 could be distributed or singular. The memory 520 could be implemented as an electrical, magnetic or optical memory, or any combination of these or other types of storage devices. It should be noted that if distributed processors are employed, each distributed processor that makes up processor 510 generally contains its own addressable memory space. It should also be noted that some or all of computer system 500 can be incorporated into an application-specific or general-use integrated circuit. For example, one or more method steps could be implemented in hardware in an ASIC rather than using firmware. A device 540 is representative of a variety of possible input/output devices (e.g., mice, keyboards, printers, etc.).

The description of the memory 520 is also generally applicable to the memories of the set-top terminal 200 of FIG. 2 and the distributed DVR controller 110 in FIGS. 1, 1a, and 3.

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. As used herein, a tangible computer-readable recordable storage medium is intended to encompass a recordable medium which stores instructions and/or data in a non-transitory manner, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

As used herein, including the claims, a "server" includes a physical data processing system (for example, system 500 as shown in FIG. 5) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules. In one or more embodiments, the code is stored in a non-transitory manner.

Non-limiting examples of languages that may be used include markup languages (e.g., hypertext markup language (HTML), extensible markup language (XML), standard generalized markup language (SGML), and the like), C/C++, assembly language, Pascal, Java, EBIF—Extended Binary Interchange Format language, UNIX shell scripts, and the like. Note that EBIF would typically only be employed in connection with a set-top box. RTSP and/or RPC can be employed for interface protocols, for example. Furthermore, non-limiting examples of useful database software include Access® software (registered mark of Microsoft Corporation, Redmond, Wash., USA); Oracle® software (registered mark of Oracle International Corporation, 500 Oracle Parkway, Redwood City, Calif. 94065, USA); Informix® software (registered mark of International Business Machines Corporation, Armonk, N.Y., USA); and structured query language (SQL) software available from many sources, including Microsoft Corporation, Redmond, Wash., USA).

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

System(s) have been described herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors such as digital signal processors (DSPs). A DSP typically comprises a combination of digital logic devices and other components, which may be a state machine or implemented with a dedicated microprocessor or micro-controller running a software program or having functions programmed in firmware.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method to be performed by a DVR controller in network communication with a digital video recorder, the method comprising the steps of:
    receiving an instruction from a user directing the digital video recorder to perform a function among a set of available functions, the set of available functions comprising a record function operative to cause the digital video recorder to record content and store that content on the digital video recorder, and a playback function operative to cause the digital video recorder to play back content stored on the digital video recorder;
    determining whether the function is to be performed substantially immediately by the digital video recorder or at a future scheduled time; and
    issuing, at substantially the future scheduled time, a command to the digital video recorder to perform the function for a function determined to be performed at the future scheduled time;
    wherein the digital video recorder is disposed in a premises of the user and is operative to play back content on a presentation device controlled by the user in response to a command from the DVR controller, and the DVR controller is remotely disposed from the digital video recorder in a facility of a content provider.

2. The method of claim 1, wherein the set of available functions further comprises at least one of a rewind function and a fast-forward function.

3. The method of claim 1, wherein the set of available functions further comprises a delete function operative to cause the digital video recorder to delete content stored on the digital video recorder.

4. The method of claim 1, further comprising the step of analyzing the instruction to determine if it causes a scheduling conflict on the digital video recorder.

5. The method of claim 4, further comprising the step of resolving the scheduling conflict if it exists.

6. The method of claim 4, wherein the step of resolving the scheduling conflict if it exists comprises at least one of canceling a recording, rescheduling a recording, and truncating a recording.

7. The method of claim 1, wherein the content comprises at least one of video content, audio content, image content, and text content.

8. The method of claim 1, wherein the digital video recorder is implemented in a set-top terminal.

9. The method of claim 1, wherein the set of available functions further comprises an information function operative to cause the digital video recorder to present information to the user.

10. The method of claim 9, wherein the information is presented as a menu or list.

11. The method of claim 9, wherein the information relates to content available for recording.

12. The method of claim 11, wherein the information is presented as an interface for selecting one or more portions of content to be recorded.

13. The method of claim 9, wherein the information relates to a scheduling conflict.

14. The method of claim 1, wherein the receiving step comprises receiving the instruction from the user via a web server.

15. The method of claim 1, wherein the DVR controller comprises distinct software modules, each of the distinct software modules being embodied on a non-transitory computer-readable storage medium, wherein the distinct software modules comprise a user device server module and a DVR record-playback command module, and wherein:
the receiving step is carried out by the user device server module executing on at least one hardware processor; and
the issuing step is carried out by the DVR record-playback command module on the at least one hardware processor.

16. A computer program product comprising a tangible non-transitory computer readable storage medium having computer readable program code embodied therewith, the computer readable program code configured to perform the steps of:
receiving at a DVR controller an instruction from a user directing a digital video recorder to perform a function among a set of available functions, the set of available functions comprising a record function operative to cause the digital video recorder to record content and store that content on the digital video recorder, and a playback function operative to cause the digital video recorder to play back content stored on the digital video recorder;
determining by the DVR controller whether the function is to be performed substantially immediately by the digital video recorder or at a future scheduled time; and
issuing from the DVR controller, at substantially the future scheduled time, a command to the digital video recorder to perform the function for a function determined to be performed at the future scheduled time;
wherein the digital video recorder is disposed in a premises of the user and is operative to play back content on a presentation device controlled by the user in response to a command from the DVR controller, and the DVR controller is remotely disposed from the digital video recorder in a facility of a content provider.

17. A DVR controller in network communication with a digital video recorder, the DVR controller comprising:
a memory; and
at least one processor, coupled to the memory, and operative to perform the steps of:
receiving an instruction from a user directing the digital video recorder to perform a function among a set of available functions, the set of available functions comprising a record function operative to cause the digital video recorder to record content and store that content on the digital video recorder, and a playback function operative to cause the digital video recorder to play back content stored on the digital video recorder;
determining whether the function is to be performed substantially immediately by the digital video recorder or at a future scheduled time; and
issuing, at substantially the future scheduled time, a command to the digital video recorder to perform the function for a function determined to be performed at the future scheduled time;
wherein the digital video recorder is disposed in a premises of the user and is operative to play back content on a presentation device controlled by the user in response to a command from the DVR controller, and the DVR controller is remotely disposed from the digital video recorder in a facility of a content provider.

18. The DVR controller of claim 17, further comprising a plurality of distinct software modules, each of the distinct software modules being embodied on a computer-readable storage medium, and wherein the distinct software modules comprise a user device server module and a DVR record-playback command module, wherein:
the at least one processor is operative to perform the receiving step by executing the user device server module; and
the at least one processor is operative to perform the issuing step by executing the DVR record-playback command module.

19. A DVR controller in network communication with a digital video recorder, the DVR controller comprising:
means for receiving an instruction from a user directing the digital video recorder to perform a function among a set of available functions, the set of available functions comprising a record function operative to cause the digital video recorder to record content and store that content on the digital video recorder, and a playback function operative to cause the digital video recorder to play back content stored on the digital video recorder;
means for determining whether the function is to be performed substantially immediately by the digital video recorder or at a future scheduled time; and
means for issuing, at substantially the future scheduled time, a command to the digital video recorder to perform the function for a function determined to be performed at the future scheduled time;
wherein the digital video recorder is disposed in a premises of the user and is operative to play back content on a presentation device controlled by the user in response to a command from the DVR controller, and the DVR controller is remotely disposed from the digital video recorder in a facility of a content provider.

* * * * *